(12) United States Patent
Zwick et al.

(10) Patent No.: US 6,499,870 B1
(45) Date of Patent: Dec. 31, 2002

(54) TAIL LIGHT FOR A MOTOR VEHICLE

(75) Inventors: Hubert Zwick, Stuttgart (DE); Otto Müller, Mülhausen (DE); Rudolf Bauder, Oberreichenbach (DE)

(73) Assignee: Reitter & Schefenacker GmbH & Co. KG, Esslingen (DE)

(*) Notice: Subject to any disclaimer, the term of this patent is extended or adjusted under 35 U.S.C. 154(b) by 0 days.

(21) Appl. No.: 09/434,994

(22) Filed: Nov. 5, 1999

(30) Foreign Application Priority Data

Nov. 6, 1998 (DE) ......................................... 198 51 174

(51) Int. Cl.⁷ .............................................. B60Q 1/26
(52) U.S. Cl. ..................... 362/505; 362/517; 362/518; 362/309; 362/543; 362/545; 362/498
(58) Field of Search ................................. 362/517, 297, 362/346, 544, 498, 518, 543, 505, 243, 247, 545, 519, 309

(56) References Cited

U.S. PATENT DOCUMENTS 5,702,173 A * 12/1997 Kawamura ..................... 362/80
6,120,169 A * 9/2000 Sato ............................. 362/517
6,257,748 B1 * 7/2001 Hashigaya ..................... 362/539

FOREIGN PATENT DOCUMENTS

DE 195 14 424 11/1995

* cited by examiner

*Primary Examiner*—Stephen Husar
*Assistant Examiner*—Anabel Ton
(74) *Attorney, Agent, or Firm*—Gudrun E. Huckett

(57) ABSTRACT

A vehicle tail light has a housing having a light source chamber and a light window delimiting one side of the light source chamber. A first light source provides a first signaling function and a second light source provides a second signaling function. The first and second light sources are mounted in the light source chamber remote from the light window. A first reflector, having a first horizontal reflection angle, and a second reflector, having a second horizontal reflection angle, are mounted in the housing opposite the light window. The first light source emits light being reflected at the first reflector onto the light window and passing through the light window to the exterior of the tail light. The second light source emits light being reflected at the second reflector onto the light window and passing through the light window to the exterior of the tail light. The second reflection angle is different from the first reflection angle.

17 Claims, 2 Drawing Sheets

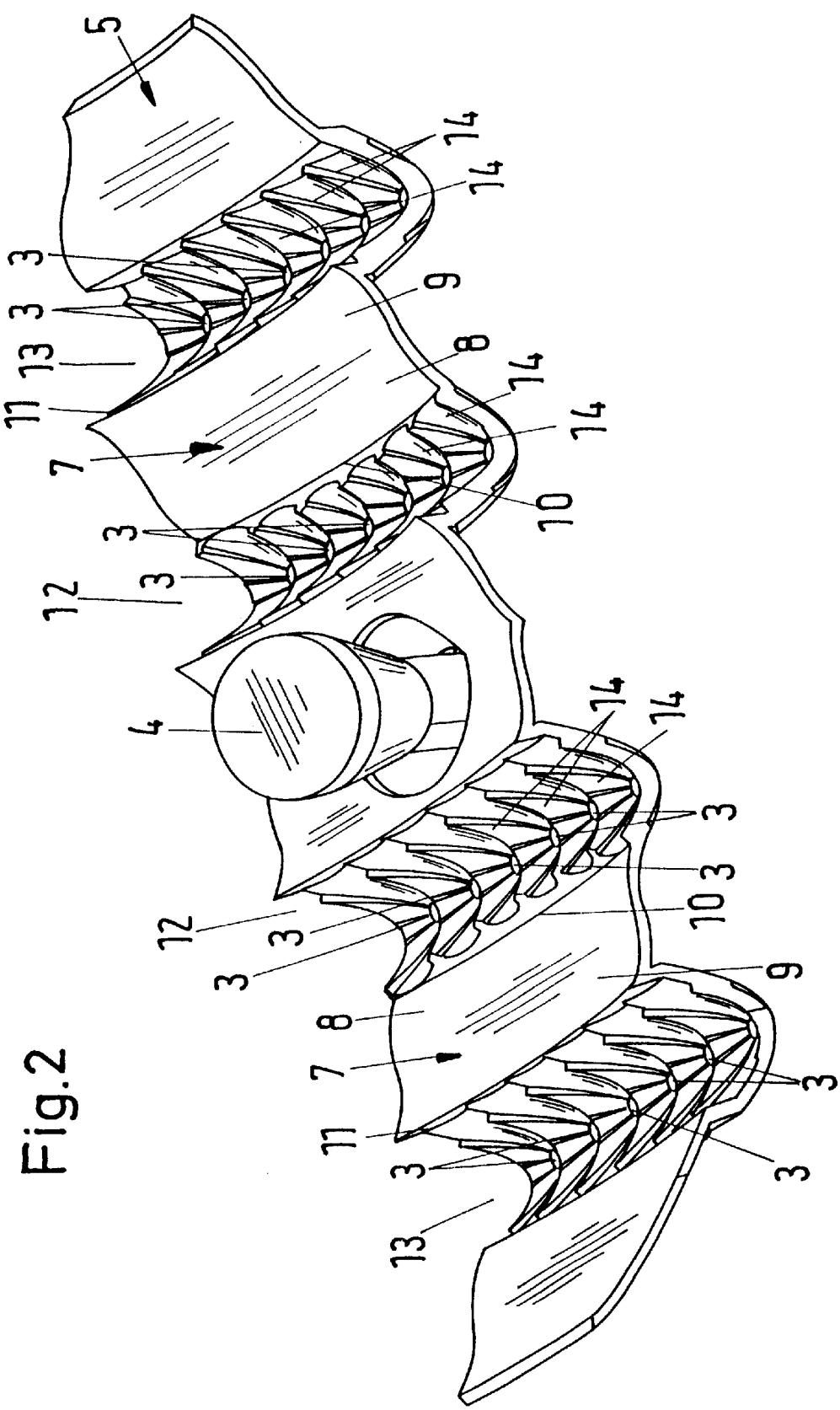

TAIL LIGHT FOR A MOTOR VEHICLE

BACKGROUND OF THE INVENTION

The present invention relates to a signal light fixture, especially a tail light fixture of vehicles, especially motor vehicles, wherein the light fixture has a light source chamber in which at least one light source for a particular signaling function is mounted. The light beams of the light source are reflected at a reflector to a light window closing off the light source chamber and exit through the light window.

The light source chamber of such a tail light (disclosed in German patent document 195 14 424) is designed such that one or another light source can be mounted therein, as desired. For both light sources a lens is provided which is designed such that, depending on the light source, the required light distribution pattern is formed. When both light sources are to be used simultaneously, two of such light fixtures are required.

It is therefore an object of the present invention to embody the aforementioned signaling light fixture such that it can be used for different signaling functions.

SUMMARY OF THE INVENTION

This object is inventively solved in that in the light source chamber at least one second light source for a second signaling function is provided having correlated therewith a second reflector which reflects the light beams of the second light source by a different horizontal angle that is different than that of the first reflector.

In the inventive signaling light fixture (such as a tail light) two light sources are mounted in the light source chamber and fulfill different signaling functions. Each light source has correlated therewith a specific reflector. These reflectors are embodied such that the light beams emitted by the different light sources are reflected at different horizontal angles. This ensures that within a single light source chamber light sources can be mounted which have different functions. For example, one light source can be the backing up light and the other light source can be used, for example, as a fog light. It is thus no longer required to provide separate signaling light fixtures for these different signaling functions.

BRIEF DESCRIPTION OF THE DRAWINGS

The object and advantages of the present invention will appear more clearly from the following specification in conjunction with the accompanying drawings, in which:

FIG. 2 shows a perspective view of a portion of the inventive tail light according to FIG. 1.

DESCRIPTION OF PREFERRED EMBODIMENTS

Figure 1:
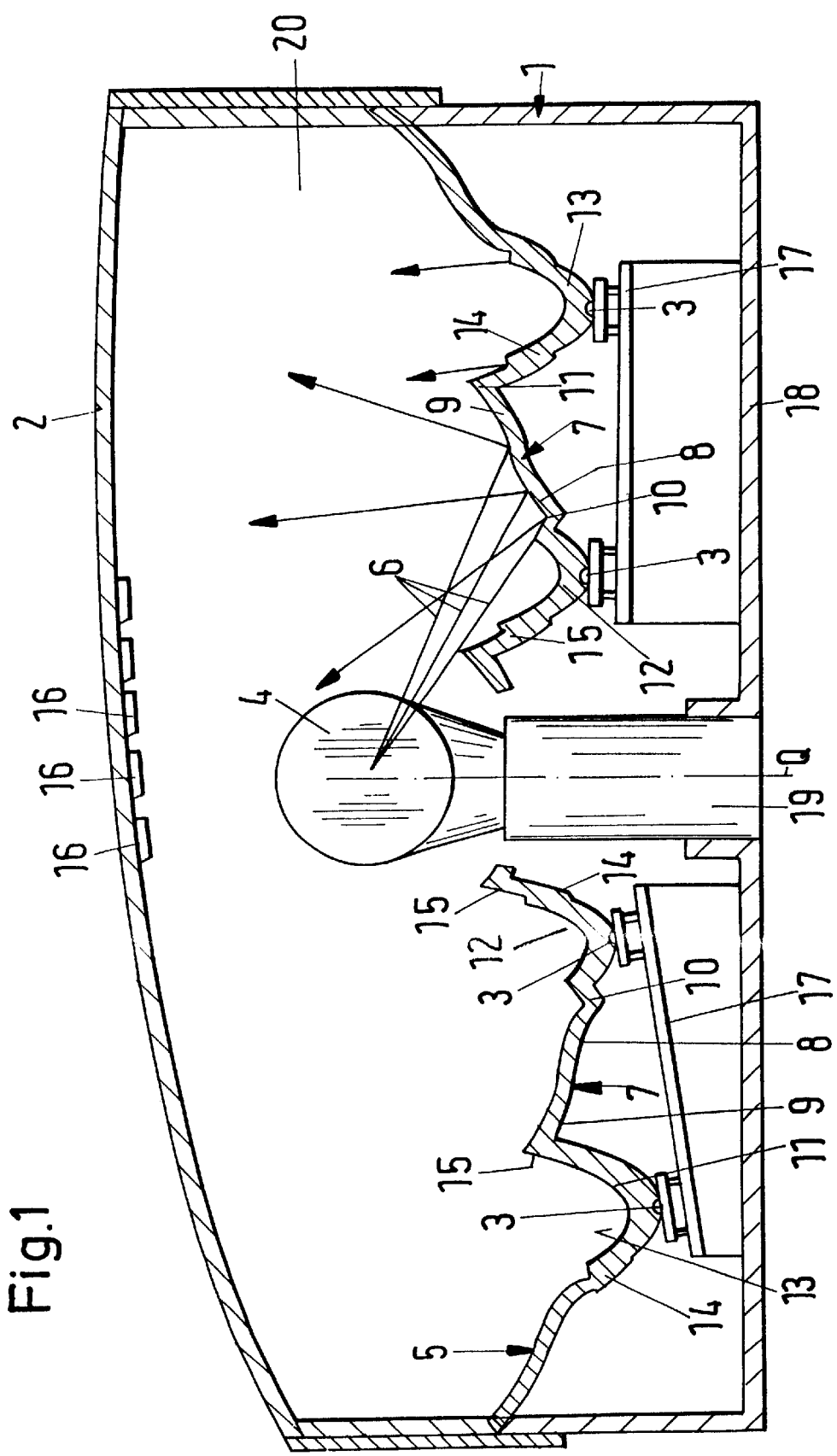
FIG. 1 shows a cross-sectional view of the inventive tail light.

The present invention will now be described in detail with the aid of several specific embodiments utilizing FIGS. 1 and 2.

In the shown embodiment, the signaling light fixture is a tail light of a vehicle, especially of a motor vehicle. It has a housing 1 which is closed off by a light window 2 through which the light emitted by the light sources 3, 4 can exit the light fixture housing 1 to the exterior. Within the housing 1 different light sources are mounted for fulfilling different signaling functions. In the shown embodiment, the light source 4 is an incandescent light bulb emitting white light which functions as a backing up light. The light source 3 is advantageously comprised of LEDs which function as a fog light and emit red light. The light window 2 itself is monochrome or colorless.

Therefore, the required signaling color is provided by the color of the respective light source 3, 4.

The lawmaker requires that the different light sources have certain beam angles in the horizontal and vertical directions. For example, for a fog light a horizontal scattering angle of 10° and for the backing up light a horizontal scattering angle of 45° are required. The small scattering angle of the fog light is achieved by emitting light intensively in the driving direction to the rear so that the vehicle provided with the fog light is easily visible by following drivers. The greater horizontal scattering angle of the backing up light is required in order to illuminate upon driving in reverse a sufficiently wide range behind the vehicle so as to prevent collision with obstacles when backing up in the dark. Furthermore, the individual signal light sources must also have a vertical scattering angle which is identical for a fog light and a backing up light.

Since the fog light 3 and the backing up light 4 have different horizontal scattering angles, separate areas must be provided on a reflector member 5 for producing the horizontal scattering for these two different light sources 3, 4. As can be seen in FIG. 1, the incandescent light bulb 4 emits light beams 6 impinging on the surface of the reflector 7 reflecting the light beams to the light window 2. The surface of the reflector 7 is designed such that at least the horizontal scattering angle of 45° is achieved. The reflector member 5 is provided on opposite sides of the incandescent light bulb 4 with reflector parts of the reflector 7. Relative to a transverse center plane Q extending through the center of the incandescent light bulb 4, the reflector parts 7 are mirror-symmetrically positioned relative to one another. In a longitudinal section the surface of the reflector 7 is S-shaped. The surface portion 8 of the reflector 7 positioned adjacent to the incandescent light bulb 4 is convex while the surface portion 9 has a concave shape. In the mounted position of the tail light the parts 8, 9 extend in the vertical direction. As is shown in FIG. 1, the two reflector surfaces 7 are positioned at an acute angle to the transverse center plane Q extending through the center of the incandescent light bulb 4 so that the reflector 7 at the part 8 in the vicinity of the incandescent light bulb has a greater spacing from the light window 2 than the reflector part 9. The surfaces of the two reflectors 7 define together with the two longitudinal edges 10, 11 a groove-shaped depression 12, 13 for a reflector 14. The groove-shaped depression 12, 13 extends over the width of the reflector member 5 and receives LEDs 3 arranged in a row at a spacing to one another. Each one of the LEDs 3 has a reflector element being part of reflector 14 correlated therewith which is configured such that the light beams emitted by the LEDs have a horizontal scattering angle of 10° in the direction toward the light window 2. The reflector elements of reflector 14 are provided in the groove-shaped depressions 12, 13. Advantageously, the reflector 14 and the reflector 7 are embodied as a monolithic part forming the reflector member 5. The reflector 14 is advantageously embodied in the form of especially designed portions of the monolithic reflector member 5. The reflectors 14 are lowered relative to the reflectors 7 into the groove-shaped depressions 12, 13. The LEDs 3 are positioned, as is shown in FIG. 1 and FIG. 2, at the lowest point of the reflectors 14.

The groove-shaped depressions 12, 13 have a sidewall 15 facing the incandescent light bulb 4 which extends to such a height that the light beams emitted by the incandescent light bulb 4 cannot reach the groove-shaped depressions 12, 13 and thus cannot impinge on the reflectors 14. In FIG. 1, the right half of the light beam emission of the light bulb 4 is shown. This illustrates that the light beams cannot impinge on the reflector 14. This prevents that the light beams of the LEDs 3 and the incandescent light bulb 4 are reflected by the same reflectors to the light window 2. Since the edge of the reflectors 7 facing the incandescent light bulb has a greater spacing from the light window 2 than the edge facing away from the light bulb, the beams emitted by the incandescent light bulb 4 cannot reach the groove-shaped depressions 13 and the reflector 14 positioned therein.

The light window 2 is provided at its inner side with horizontal cylinder lenses 16 which scatter the light beams coming from the reflector member 5 in the vertical direction. For the fog light in the form of LEDs 3 and for the backing up light in the form of the colorless incandescent light bulb 4, the same vertical scattering angle is required so that for both light sources the same cylinder lenses 16 can be used. The reflectors 7, 14 only ensure the scattering of the light beams in the horizontal direction. The cylinder lenses 16 prevent the unimpeded view into the interior of the tail light. Because of the disclosed embodiment of the reflector member 5 and of the light sources 3, 4, an overlap of the reflector areas 7 and 14 for the backing up light 4 and the fog light 3 is prevented. The spacing of the reflector member 5 from the light window 2 as well as the horizontal scattering at the reflector member 5 are adjusted to one another such that at least sixty percent of the surface of the light window 2 is illuminated when using the respective signaling light sources 3, 4.

The LEDs 3 are advantageously mounted on a single plane printed circuit board 17. Since the LEDs 3 are positioned on opposite sides of the incandescent light bulb 4, at both sides of the light bulb 4 a respective printed circuit board 17 for the LEDs 3 is provided. In the right half of the drawing FIG. 1 the printed circuit board 17 extends parallel to the bottom 18 of the housing 1. The left printed circuit board 17 of FIG. 1 is positioned at an acute angle to the bottom 18 of the housing 1. Beginning at the lamp socket 19 for the incandescent light bulb 4, the printed circuit board 17 extends at a slant toward the bottom 18, can be seen in FIG. 1. Since the LEDs on both sides of the incandescent light bulb 4 are positioned in a common plane, plane printed circuit boards 17 can be used which are simple with respect to design considerations and can be manufactured inexpensively. They can be easily mounted in the housing 1.

Since the light window 2 has a greater spacing to the bottom 18 at the right half of the drawing than the left half of the drawing, the reflector member 5 is thus positioned at a slant. The right edge of the reflector 5 shown in FIG. 1 has accordingly a greater spacing from the bottom 18 than the left edge shown in FIG. 1.

In the disclosed housing 1 the light sources 3, 4 are mounted within a single light source chamber 20 and provide different signaling functions. Due to the disclosed design of the reflector member 5, both light sources 3, 4 can be used simultaneously without impairing the signaling function of the other light source 3, 4. The light window 2 is monochrome while the light sources 3, 4 emit colored light corresponding to the desired signaling function.

In the disclosed and described embodiment, the light bulb 4 is colorless (white light) while the LEDs 3 are red. Accordingly, the light sources mounted within the light source chamber 20 can be used for other signaling functions than the ones disclosed, for example, as a brake light or a turn signal/emergency flasher.

The specification incorporates by reference the disclosure of German priority document 198 51 174.4 of Nov. 6, 1998.

The present invention is, of course, in no way restricted to the specific disclosure of the specification and drawings, but also encompasses any modifications within the scope of the appended claims.

What is claimed is:

1. A vehicle taillight comprising:
   a housing (1) having a light source chamber (20) and a light window (2) delimiting one side of said light source chamber (20);
   a first light source (4), providing a first signaling function, and second light source (3), providing a second signaling function, mounted in said light source chamber (20) remote from said light window (2);
   a first reflector (7), having a first horizontal reflection angle, and a second reflector (14), having a second horizontal reflection angle, mounted in said housing (1) opposite said light window (2);
   said first light source (4) emitting light being reflected at said first reflector (7) onto said light window (2) and passing through said light window (2) to the exterior of said taillight;
   said second light source (3) emitting light being reflected at said second reflector (14) onto said light window (2) and passing through said light window (2) to the exterior of said taillight, wherein said second light source comprises at least one LED;
   wherein said second reflection angle is different from said first reflection angle, and wherein said first light source (4) is an incandescent light bulb and wherein said first reflector (7) has a concave surface portion (9) remote from said light source (4).

2. A vehicle taillight according to claim 1, wherein said first reflector (7) is mounted such that only the light emitted by said first light source (4) is reflected at said first reflector (7) and wherein said second reflector (14) is mounted such that only the light emitted by said second light source (3) is reflected at said second reflector (14).

3. A vehicle taillight according to claim 1, wherein said at least one depression (12, 13) has a bottom and wherein said second light source (3) is mounted at said bottom.

4. A vehicle taillight according to claim 1, wherein said second reflector (14) is comprised of multiple reflector elements and wherein said multiple reflector elements are positioned in said at least one depression (12, 13).

5. A vehicle taillight according to claim 1, wherein said second light source (3) is configured to act as a rear fog light.

6. A vehicle taillight according to claim 5, wherein said second light source is configured to emit red light.

7. A vehicle taillight according to claim 1, wherein said first light source is an incandescent light bulb.

8. A vehicle taillight according to claim 1, wherein said second light source is a backing up light (4).

9. A vehicle taillight according to claim 1, wherein said second light source emits white light.

10. A vehicle taillight according to claim 1, wherein said first reflector has an S-shaped cross-section.

11. A vehicle taillight comprising:
    a housing (1) having a light source chamber (20) and a light window (2) delimiting one side of said light source chamber (20);
    a first light source (4), providing a first signaling function, and second light source (3), providing a second signaling function, mounted in said light source chamber (20) remote from said light window (2);

a first reflector (7), having a first horizontal reflection angle, and a second reflector (14), having a second horizontal reflection angle, mounted in said housing (1) opposite said light window (2), said first reflector comprising a first reflector part and a second reflector part positioned opposite one another relative to said first light source (4), wherein said first and second reflectors (7, 14) are combined to a monolithic reflector member (5), said monolithic reflector member (5) having at least one depression (12, 13), said second reflector (14) arranged in said at least one depression (12, 13), wherein at least two of said depressions (12, 13) are provided and are positioned opposite one another relative to said first light source (4);

said first light source (4) emitting light being reflected at said first reflector (7) onto said light window (2) and passing through said light window (2) to the exterior of said taillight;

said second light source (3) emitting light being reflected at said second reflector (14) onto said light window (2) and passing through said light window (2) to the exterior of said taillight;

wherein said second reflection angle is different from said first reflection angle.

12. A vehicle taillight comprising:

a housing (1) having a light source chamber (20) and a light window (2) delimiting one side of said light source chamber (20);

a first light source (4), providing a first signaling function, and second light source (3), providing a second signaling function, mounted in said light source chamber (20) remote from said light window (2);

a first reflector (7), having a first horizontal reflection angle, and a second reflector (14), having a second horizontal reflection angle, mounted in said housing (1) opposite said light window (2), wherein said first and second reflectors (7, 14) are combined to a monolithic reflector member (5), said monolithic reflector member (5) having at least one depression (12, 13);

said first light source (4) emitting light being reflected at said first reflector (7) onto said light window (2) and passing through said light window (2) to the exterior of said taillight;

said second light source (3) emitting light being reflected at said second reflector (14) onto said light window (2) and passing through said light window (2) to the exterior of said taillight, wherein said second light source (3) comprises multiple light elements and wherein said light elements are arranged in a common plane in said at least one depression (12, 13);

wherein said second reflection angle is different from said first reflection angle; and a plane printed circuit board (17), wherein said light elements (3) are mounted on said printed circuit board (17).

13. A vehicle taillight comprising:

a housing (1) having a light source (20) and a light window (2) delimiting one side of said light source chamber (20);

a first light source (4), providing a first signaling function, and second light source (3), providing a second signaling function, mounted In said light source chamber (20) remote from said light window (2);

a first reflector (7), having a first horizontal reflection angle, and a second reflector (14), having a second horizontal reflection angle, mounted in said housing (1) opposite said light window (2);

said first light source (4) emitting light being reflected at said first reflector (7) onto said light window (2) and passing through said light window (2) to the exterior of said taillight;

said second light source (3) a meeting light being reflected at said second reflector (14) onto said light window (2) and passing through said light window (2) to the exterior of said taillight;

wherein said second reflection angle is different from said first reflection angle;

wherein said light window has cylindrical lenses (16) mounted at a side thereof facing said first and second light sources (3, 4), wherein said cylindrical lenses (16) are configured to vertically scatter the light emitted by said first and second light sources.

14. A vehicle taillight according to claim 1, wherein four of said depressions (12, 13) are provided and wherein two of said depressions (12, 13) are respectively positioned on opposite sides of said first light source (4).

15. A vehicle taillight according to claim 14, wherein between said two depressions (12, 13) on each one of said opposite sides one of said first and second reflector parts are positioned.

16. A vehicle taillight according to claim 14, wherein two of said depressions directly adjacent to said first light sources (4) each have a sidewall (15) projecting upwardly to a position relative to said first light source (4) such that the light emitted by said first light source (4) impinges only on said first reflector (7).

17. A vehicle taillight according to claim 1, wherein said light window (2) is monochrome.

* * * * *